US008577368B2

(12) United States Patent
Räsänen

(10) Patent No.: US 8,577,368 B2
(45) Date of Patent: Nov. 5, 2013

(54) METHOD FOR THE TRANSFER OF INFORMATION DURING HANDOVERS IN A COMMUNICATION SYSTEM

(75) Inventor: Juha Räsänen, Espoo (FI)

(73) Assignee: Nokia Corporation, Espoo (FI)

( * ) Notice: Subject to any disclaimer, the term of this patent is extended or adjusted under 35 U.S.C. 154(b) by 672 days.

(21) Appl. No.: 11/482,084

(22) Filed: Jul. 7, 2006

(65) Prior Publication Data

US 2007/0211694 A1    Sep. 13, 2007

(30) Foreign Application Priority Data

Mar. 13, 2006  (FI) ...................................... 20060240

(51) Int. Cl.
*H04W 16/16*  (2009.01)
(52) U.S. Cl.
USPC ........ 455/436; 455/435.1; 455/437; 455/445; 370/331; 370/352; 370/395.2; 725/62
(58) Field of Classification Search
USPC ......... 370/352, 328, 230, 389, 401, 392, 466, 370/331; 455/445, 433, 453; 725/118, 62; 726/4; 709/229, 245
See application file for complete search history.

(56) References Cited

U.S. PATENT DOCUMENTS

| 6,937,566 | B1 * | 8/2005 | Forslow ........................ 370/231 |
| 7,236,786 | B2 * | 6/2007 | Shen et al. .................... 455/436 |
| 7,539,163 | B2 * | 5/2009 | Lin ................................ 370/331 |
| 8,116,776 | B1 * | 2/2012 | Jagadeesan et al. .......... 455/438 |
| 2002/0150084 | A1 * | 10/2002 | Lee et al. ...................... 370/352 |
| 2002/0181419 | A1 * | 12/2002 | Zhang et al. .................. 370/331 |
| 2003/0007490 | A1 * | 1/2003 | Yi et al. ......................... 370/394 |
| 2003/0076803 | A1 * | 4/2003 | Chuah ........................... 370/338 |
| 2004/0029585 | A1 * | 2/2004 | Akgun et al. ............... 455/432.2 |
| 2004/0073928 | A1 * | 4/2004 | Alakoski et al. ................ 725/62 |
| 2004/0147262 | A1 * | 7/2004 | Lescuyer et al. .............. 455/434 |
| 2004/0202132 | A1 * | 10/2004 | Heinonen et al. ............. 370/331 |

(Continued)

FOREIGN PATENT DOCUMENTS

| WO | 2005/027558 A1 | 3/2005 |
| WO | 2006/018670 A1 | 2/2006 |

OTHER PUBLICATIONS

Wei Wu, et al. "SIP-based Vertical Handoff Between WWANs and WLANs," Wireless Communications, IEEE (see also IEEE Personal Communications), vol. 12, No. 3, pp. 66-72, Jun. 2005.

(Continued)

*Primary Examiner* — Mahendra Patel
(74) *Attorney, Agent, or Firm* — Alston & Bird LLP

(57) ABSTRACT

The invention relates to a method for the transfer of policy control information during handover in a communication system. A session between a terminal and a remote node via a first network node has been established previously. The session comprising media components transmitted via the first gateway using first media component bearers. A handover condition is detected and a signaling connection is established between the terminal and the second gateway. Information on a second network node is obtained by the terminal, which determines if a proxy for the session has changed. If it has, information on media components is sent to a policy decision entity associated with the second network node. The policy decision entity authorizes second media component bearers with the information provided. Finally, the second media component bearers are established between the terminal and the second gateway.

34 Claims, 9 Drawing Sheets

(56) References Cited

U.S. PATENT DOCUMENTS

| | | | |
|---|---|---|---|
| 2004/0225534 A1* | 11/2004 | Zheng | 705/4 |
| 2004/0229596 A1* | 11/2004 | Stura et al. | 455/406 |
| 2005/0101329 A1* | 5/2005 | Gallagher | 455/436 |
| 2005/0135375 A1* | 6/2005 | Hurtta et al. | 370/395.2 |
| 2006/0025151 A1* | 2/2006 | Karaoguz et al. | 455/455 |
| 2006/0120287 A1* | 6/2006 | Foti et al. | 370/231 |
| 2006/0153124 A1* | 7/2006 | Kant et al. | 370/328 |
| 2006/0193272 A1* | 8/2006 | Chou et al. | 370/310 |
| 2006/0245574 A1* | 11/2006 | Phelps et al. | 379/229 |
| 2007/0207805 A1* | 9/2007 | Pallares Lopez et al. | 455/436 |
| 2007/0259667 A1* | 11/2007 | Kim et al. | 455/440 |
| 2008/0008088 A1* | 1/2008 | Nagarajan et al. | 370/220 |
| 2009/0168692 A1* | 7/2009 | Chen | 370/328 |

OTHER PUBLICATIONS

3GPP TS 23.228 V7. 2.0 (Dec. 2005), 3rd Generation Partnership Project; Technical Specification Group Services and Systems Aspects; IP Multimedia Subsystem (IMS); Stage 2 (Release 7), Dec. 2005, pp. 58-61.

de Gouveia, F.C. et al. "A Framework to Improve QoS and Mobility Management for multimedia Application in the IMS," Mulitmedia, Seventh IEEE International Symposium on, vol., No., p. 7 pp. -, Dec. 12-14, 2005.

International Search Report, PCT/FI2007/000062, filed Mar. 13, 2007.

* cited by examiner

METHOD FOR THE TRANSFER OF INFORMATION DURING HANDOVERS IN A COMMUNICATION SYSTEM

BACKGROUND OF THE INVENTION

1. Field of the Invention

The invention relates to Quality of Service (QoS) in packet switched communication systems. Quality of Service is enforced by way of policy enforcement and control. Policy enforcement is applied at access network gateways under the control of a policy decision function. Particularly, the invention relates to a method for the transfer of information between policy decision functions during handover in a communication system. The information may be related, for example, to policy control.

2. Description of the Related Art

The transport of voice and multimedia over packet switched networks has in the recent years emerged as a viable alternative for traditional circuit switched networks. In circuit switched networks resource allocation is based on the allocation of an entire physical circuit or on the allocation of a repeating timeslot within a physical circuit for a given user. From an abstract point of view the transport technology relieves the network of complexity involving admission control and Quality of Service (QoS) allocation. In packet switched networks the transport technology inherently does not provide the users with guarantees involving the QoS available for a single user. QoS is observed in terms of such properties as, for example, data rate, delay, the variation of delay and bit error probability. These properties are usually referred to as QoS parameters. The users must be guaranteed certain QoS parameters. However, other users must also be taken into consideration before granting given QoS parameters for a given new user. In other words, it must be ensured that the capacity of the system is not exceeded when implementing the new users QoS requirements in the system. The QoS guarantees already committed to must be sustained. It must be checked that an increase in the use of a variety of resources such as packet queues in network nodes, network node packet switching capacity and transmission line capacity does not cause a relaxation from already guaranteed parameters such as maximum delays and data rates.

In order to control the access of new users to network resources admission control is applied. In packet switched networks admission control entities have been introduced to control access to network resources. The admission control entities are interfaced by users or by network nodes on behalf of users in order to perform QoS allocation for users. Admission control may be performed in small scale for individual users or for flows originated by individual users. In larger scale admission control may be performed for entire networks at the edge of a large core network by determining that the networks adhere to predefined service level agreements. Examples of technologies for the implementation of QoS in Internet Protocol (IP) networks include Integrated Services (IntServ) and Differentiated Services (DiffServ) defined in the Internet Engineering Task Force (IETF) documents RFC 2210 and RFC 2475, respectively. Yet another standard for the QoS is the Multi Label Protocol Switching (MPLS) defined in IETF document RFC 3032. In the Common Open Policy Services (COPS) framework defined in the IETF document RFC 2753, the admission control decisions are centralized to a Policy Decision Point (PDP), which makes decisions whether to admit a certain flow or set of flows to the network on behalf of a Policy Enforcement Point (PEP). The PEP is in practice a router or a network edge node. When receiving an allocation request for a flow, the PEP contacts the PDP. The PDP returns a policy decision to the PEP, which in effect tells whether the flow should be admitted or denied. The QoS parameters may entirely be provided from the PDP or simply modified by the PDP. The information regarding a flow or a set of flows is obtained to a PEP, for example, via the Resource Reservation Protocol (RSVP) defined in the IETF document RFC 2205.

In the Universal Mobile Telecommunications System (UMTS) the Common Open Policy Services protocol defined in the IETF document RFC 2748 or the Diameter protocol defined in the IETF document RFC 3588 is used to obtain QoS parameters for Packet Data Protocol (PDP) contexts based on at least one set of binding information provided from a Mobile Station (MS). Each such set of binding information may consist, for example, of an authorization token and a number of flow identifiers. The binding information may also consist of a user identifier or of a user equipment identifier, which may be accompanied by flow identifiers such as IP packet filters. The authorization token provides the Fully Qualified Domain Name (FQDN) of a Policy Decision Point (PDP) and a unique session identifier within the PDP. The flow identifiers identify uniquely either a single IP flow or a bi-directional combination of two IP flows associated with the session.

Reference is now made to FIG. 1, which illustrates a Universal Mobile Telecommunications System (UMTS) in prior art. In FIG. 1 there is shown a mobile station 100, which communicates with a Radio Network Controller (RNC) 114 within a Radio Access Network 110. The communication occurs via a Base Transceiver Station (BTS) 112. The radio access network 110 is, for example, a 2G GSM/EDGE radio access network or a 3G UMTS radio access network. An IP Connectivity Access Network (IP-CAN) functionality (not shown) connected to access network 110 comprises at least a Serving GPRS Support Node (SGSN) 122 and a Gateway GPRS Support Node (GGSN) 124. The functionality of a GPRS based IP-CAN is disclosed in the 3G Partnership Project specification 23.060. SGSN 122 performs all mobility management related tasks and communicates with a Home Subscriber Server (HSS) 160 in order to obtain subscriber information. GGSN 124 provides GPRS access points. There is an access point, for example, to a Media Gateway (MGW) 126, to a first router 142 attached to an IP network 140, and to a Proxy Call State Control Function (P-CSCF) 152. The access point to IP network is used to relay packets to/from an IP network node (IP-N) such as 147. The packets may be related to, for example, Internet browsing or File Transfer Protocol (FTP) file transfer. The access point for P-CSCF 152 is used to convey signaling traffic pertaining to IP multimedia. GGSN 124 establishes Packet Data Protocol (PDP) contexts, which are control records associated with a mobile subscriber such as mobile station 100. A PDP context provides an IP address for packets received from or sent to mobile station 100. A PDP context has also associated with it a UMTS bearer providing a certain QoS for mobile station 100. In GGSN 124 there is a primary PDP context for the signaling packets associated mobile station 100. For the user plane data packets carrying at least one IP flow there is established at least one secondary PDP context. The at least one IP flow is established between a calling terminal and a called terminal in association with an IP multimedia session. An IP flow carries a multimedia component such as a voice or a video stream in one direction. For voice calls at least two IP flows are required, one for the direction from the calling terminal to the called terminal and one for the reverse direction. In this case an IP flow is defined as a quintuple consisting of a source port, a source address, a destination address, a destination port and a protocol identifier.

The communication system illustrated in FIG. 1 comprises also the IP Multimedia Subsystem (IMS) functionality. The IMS is used to set-up multimedia sessions over IP-CAN. The network elements supporting IMS comprise at least one Proxy Call State Control Function (P-CSCF), at least one Inquiring Call State Control Function (I-CSCF), at least one Serving Call State Control Function S-CSCF, at least one Brakeout Gateway Control Function (BGCF) and at least one Media Gateway Control Function (MGCF). As part of the IMS there is also at least one Home Subscriber Server (HSS). Optionally, there is also at least one Application Server, which provides a variety of value-added services for mobile subscribers served by the IP multimedia subsystem (IMS). The IMS is disclosed in the 3G Partnership Project (3GPP) specification 23.228.

P-CSCF 152 receives signaling plane packets from GGSN 124. The P-CSCF usually comprises a Policy Decision Function (PDF), which corresponds to a Policy Decision Point (PDP) familiar from the COPS framework. The PDF may also be implemented as a separate PDP, which communicates with the P-CSCF. Without the authorization from the P-CSCF, a primary PDP context is opened in GGSN 124. Via the primary PDP context are sent signaling plane packets used to set-up an IP multimedia session between mobile station 100 and another a called party terminal (TE) 146. However, it should be noted that an un-guaranteed QoS IP multimedia session may be established with the called party terminal 146 or IP network node 147 via the access point connecting to router 142. The purpose of the IMS, among other things, is to provide a system for guaranteeing a certain QoS for the IP multimedia session. Session Initiation Protocol (SIP) signaling messages are carried in the signaling plane packets. The Session Initiation Protocol (SIP) is disclosed in the Internet Engineering Task Force (IETF) document RFC 3261. The signaling message is processed by P-CSCF 152, which determines the correct serving network for the mobile station 100 that sent the signaling packet. The determination of the correct serving network is based on a home domain name provided from mobile station 100. Based on the home domain name is determined the correct I-CSCF, which in FIG. 1 is I-CSCF 154. I-CSCF 154 hides the topology of the serving network from the networks, in which mobile station 100 happens to be roaming. I-CSCF 154 takes contact to home subscriber server 160, which returns the name of the S-CSCF, which is used to determine the address of S-CSCF 156 to which the mobile station 100 is to be registered. If I-CSCF 156 must select a new S-CSCF for mobile station 100, home subscriber server 160 returns required S-CSCF capabilities for S-CSCF selection. Upon receiving a registration, S-CSCF 156 obtains information pertaining to the profile of the mobile station 100 from HSS 160. The information returned from HSS 160 may be used to determine the required trigger information that is used as criterion for notifying an application server 162. Application server 162 may be notified on events relating to incoming registrations or incoming session initiations. Application server 162 communicates with S-CSCF 156 using the ISC-interface. The acronym ISC stands for IP multimedia subsystem Service Control interface. The ISC interface is disclosed in the 3GPP specification 23.228. The protocol used on ISC interface is SIP. AS 162 may alter SIP invite message contents that it receives from S-CSCF 156. The modified SIP invite message is returned back to S-CSCF 156.

If the session to be initiated is targeted to a PSTN subscriber or a circuit switched network subscriber, the SIP invite message is forwarded to a BGCF 158. BGCF 158 determines the network in which interworking to PSTN or the circuit switched network should be performed. In case PSTN interworking is to be performed in the current network, the SIP invite message is forwarded to MGCF 159 from BGCF 158. MGCF 159 communicates with MGW 126. The communication uses, for example, the MEGACO protocol defined in IETF document 3525. The user plane packets carrying a media bearer or a number of interrelated media bearers for the session are routed from GGSN 124 to MGW 126 as illustrated in FIG. 1.

If the session to be initiated is targeted to terminal 146, which is a pure IP terminal, S-CSCF 156 forwards the SIP Invite message to terminal 146. Terminal 146 communicates with a second router 144, which interfaces IP network 140. IP network 140 is used to carry the user plane IP flows associated with the session established between mobile station 100 and terminal 146. The user plane IP flows between first router 142 and GGSN 124 are illustrated with line 128. The user plane IP flows between second router 144 and terminal 146 are illustrated with line 148.

In order to allocate the end-to-end QoS required for the user plane IP flows between mobile station 100 and terminal 146, the GGSN 124 provides to a PDF within P-CSCF 152 at least one set of binding information provided from a mobile station 100. If token based binding is used, the sets of binding information have been formed in the PDF within P-CSCF 152 in response to SIP signaling and the Session Description Protocol (SDP) definitions carried in the SIP signaling messages. In order to form a set of binding information, the PDF has allocated a unique identifier for a session to be established and has assigned unique flow identifiers for each IP flow or each bi-directional combination of two IP flows observed in the SDP definitions. The unique identifier together with the PDF FQDN is used to form an authorization token for the session in the PDF. The authorization token is returned to mobile station 100 as binding information. There may be other authorization tokens for other parallel sessions. Mobile station 100 also assigns unique flow identifiers for each IP flow or each bi-directional combination of two IP flows observed in the SDP definitions in the same way as the PDF. Instead of a token, the binding may be based on other mechanisms, for example, on user identification or user equipment identification and at least one flow filter.

The mobile station 100 sends the binding information, for example, the authorization token and the flow identifiers of the IP flows or bi-directional IP flow combinations to be set up, to the GGSN 124 upon the secondary PDP context establishment. The GGSN 124 sends the binding information to the PDF in an authorization request. In response to the sets of binding information, the PDF returns the QoS information for the IP flows identified in the sets of binding information. The QoS information is used to establish a UMTS bearer between GGSN 124 and mobile station 100. The QoS information is also used to establish an external bearer between GGSN 124 and terminal 146. The UMTS bearer is established using signaling towards SGSN 122 and from there to RNC 114. The UMTS bearer comprises a radio access bearer and a core network bearer. The external bearer is established from GGSN 124 either explicitly using RSVP signaling or implicitly by assigning the user plane packets associated with an IP flow a certain Differentiated Service Code Point (DSCP).

Reference is now made to FIG. 2, which illustrates a dual-system mobile station and two different IP connectivity access networks connected to a single IP multimedia subsystem in prior art. In FIG. 2 there is a communication system 200 comprising an IP Multimedia Subsystem (IMS) 250, two IP Connectivity Access Networks (IP-CAN), namely IP-CAN 210 and IP-CAN 220, and a mobile station 202. Mobile station 202 may also support fixed network access, in other words, it may be connected via a cable or a short range wireless interface to a fixed access network. IP-CAN 210 and IP-CAN 220 may represent different access network technologies, fixed or wireless, such as, for example, Digital Subscriber Line (xDSL), Worldwide Interoperability for Microwave Access (WiMAX), IEEE 802.11b or IEEE 802.11g Wireless Local Area Network (WLAN), GSM or UMTS. IP-CAN 210 and IP-CAN 220 may also represent networks based on same technologies, but may be administered by different network operators. IP-CAN 210 communicates with IMS 250 via gateway (GW) 212. IP-CAN 220 communicates with IMS 250 via gateway (GW) 222. The gateways may be, for example, GPRS GGSNs or gateway nodes for other types of access networks. Generally, a gateway node performs such tasks as, for example, providing at least one bearer for communicating with mobile station 202, QoS policy enforcement and packet marking, and network address translation. The gateways 212 and 222 communicate with P-CSCFs 240 and 242, respectively. The gateways 212 and 222 comprise policy enforcement functions, which obtain policy information from Policy Decision Functions (PDF) 230 and 232, respectively. The PDFs 230 and 232 may be comprised in P-CSCFs 240 and 242, respectively, or each of the PDFs may be a standalone entity or be integrated in a gateway. A single P-CSCF may communicate with a number of PDFs and vice versa.

Whenever required, gateways 212 and 222 establish an external bearer towards a media gateway (MGW) 262, which interfaces a circuit switched network such as PSTN 280. The gateways 212 and 222 may also establish external bearers directly to gateways or Session Border Controllers (SBC) in other IP-CANs or directly to end-user terminals. An external bearer should be distinguished from an internal bearer, which connects a gateway to an end-user station in an IP-CAN. An external bearer may carry a single multimedia component or a number of multimedia components. In FIG. 2 the external bearers from gateways 212 and 222 to MGW 262 are illustrated with lines M1 and M2. In FIG. 2 there is also an S-CSCF 254, I-CSCFs 270 and 272, which communicate with P-CSCFs 240 and 242, respectively, and determine using an HSS 252 the S-CSCF, which currently serves mobile station 202, for example S-CSCF 254. In FIG. 2 there are also illustrated an AS 256, BGCF 258 and MGCF 260.

The problem in prior art solutions such as illustrated in FIGS. 1 and 2 is that it currently not possible to change the P-CSCF during an ongoing session for an end-user station. If a new P-CSCF is to be allocated for the session due to the use of a new IP-CAN, the new P-CSCF does not obtain the session related parameters comprising information on the multimedia components and their QoS requirements from the old P-CSCF to be provided to the new PDF under the control of the new P-CSCF. Furthermore, currently a mobile station does not take heed on the changing of the P-CSCF during a handover. Thus, a new mechanism is needed, which supports the changing of a P-CSCF during an ongoing session and provides the new P-CSCF with the session related parameters necessary to perform policy decisions at the establishment of bearers from the end-user station. The problems associated with the lack of session related parameters may lead to the obtaining of extra bandwidth during handovers since the gateway does not get information on the QoS parameters to be applied for the bearers of the end-user station that performed the handover.

SUMMARY OF THE INVENTION

The invention relates to a method for the transfer of policy control information during handover in a communication system comprising at least a terminal, a first gateway, a second gateway, a first network node and a second network node. The method comprises: establishing a session between said terminal and a remote node via said first network node, said session comprising at least one media component transmitted via said first gateway using at least one first media component bearer; detecting a handover condition in said terminal; establishing a signaling connection between said terminal to said second gateway; obtaining information on said second network node to said terminal; determining whether said first network node and said second network node are different nodes; providing information on the at least one media component to a policy decision entity associated with said second network node; authorizing at least one second media component bearer with said information on the at least one media component in said policy decision entity; and establishing said at least one second media component bearer between said terminal and said second gateway.

The invention relates also to a communication system for the transfer of policy control information during handover comprising: a terminal configured to establish a session to a remote node via a first network node, said session comprising at least one media component, to transmit said at least one media component via a first gateway using at least one first media component bearer, to detect a handover condition, to request the establishing of a signaling connection between said terminal and a second gateway, to obtain information on a second network node, to determine whether said first network node and said second network node are different nodes, to provide information on the at least one media component to said second network node and to request the establishing of at least one second media component bearer between said terminal and said second gateway; said second gateway configured to establish a signaling connection between said terminal and a second gateway, to obtain authorization for the establishing of said at least one second media component bearer, and to establish said at least one second media component bearer between said terminal and said second gateway; said second network node configured to obtain information on the at least one media component and to provide said information on the at least one media component to a policy decision entity; and said policy decision entity configured to authorize said at least one second media component bearer with said information on the at least one media component.

The invention relates also to an electronic device comprising a signaling entity configured to establish a session to a remote node via a first network node, said session comprising at least one media component, to obtain information on a second network node, to determine whether said first network node and said second network node are different nodes and to provide information on the at least one media component to said second network node; a communication entity configured to transmit said at least one media component via a first gateway using at least one first media component bearer; a handover entity configured to detect a handover condition; and a bearer control entity configured to request the establishing of a signaling connection between said terminal and a second gateway and to request the establishing of at least one second media component bearer between said terminal and said second gateway.

The invention relates also to a network node comprising a signaling entity configured to obtain information on a handover from a terminal, to obtain information on at least one media component, to determine a node serving said terminal, to provide information on the handover to the node serving said terminal and to provide information on the at least one media component to a policy decision entity.

The invention relates also to a computer program comprising code adapted to perform the following steps when executed on a data-processing system: establishing a session to a remote node via a first network node, said session comprising at least one media component transmitted via a first gateway using at least one first media component bearer; detecting a handover condition; establishing a signaling connection to a second gateway; obtaining information on a second network node; determining whether said first network node and said second network node are different nodes; providing information on the at least one media component to said second network node; and establishing at least one second media component bearer to said second gateway. The invention relates also to a computer program comprising code adapted to perform the following steps when executed on a data-processing system: obtaining information on a handover from a terminal; obtaining information on at least one media component; determining a node serving said terminal; provide information on the handover to the node serving said terminal; and providing information on the at least one media component to a policy decision entity.

In one embodiment of the invention, the establishing of said at least one second media component bearer between said terminal and said second gateway consists of a reservation of resources on the user plane. A media component bearer may correspond to a certain amount of bandwidth allocated from the user plane bandwidth available.

In one embodiment of the invention, the second network node is configured to provide information on the at least one media component from said second network node to said policy decision entity associated with said second gateway. The information provided comprises the media component types, their bandwidth requirements and their grouping to bearers. The information is provided, for example, using the Diameter protocol. In response, the second network node obtains binding information comprising, for example, an authorization token identifying the session, if token based authorization is used. The binding information is provided to the terminal together with information on the grouping of the media components to bearers, if token based authorization is used. The terminal is configured to initiate the establishing of said at least one second media component bearer between said terminal and said second gateway. The second gateway is configured to send a query to said policy decision entity. The second gateway enquires the policy decision entity upon receiving a request to establish the at least one second media component bearer from the terminal. The request provides binding information to the second gateway. If token based authorization is used, the request may carry the authorization token and the information on the grouping of the media components to bearers. Otherwise, the binding information simply comprises a user identity or a user equipment identity obtained from the terminal. It may also comprise flow identifiers such as IP packet filters. The enquiry from the second gateway to the policy decision entity also provides the binding information to the policy decision entity. The policy decision entity is configured to check said information on said at least one media component and to authorize to said second gateway said establishing of said at least one second media component bearer between said terminal and said second gateway. The policy decision entity finds the information on at least one media component and the session using the binding information.

In one embodiment of the invention, the second network node is configured to provide information on the at least one media component from said second network node to said policy decision entity associated with said second gateway. Thereupon, the policy decision entity pushes the authorization information relating to an entity for resource reservation on the user plane. Such an entity is, for example, the second gateway. Thus, instead of the second gateway enquiring the policy decision entity, that is, pulling information from the policy decision entity, the policy decision entity may send, that is, push the authorization information to the gateway. The push operation is useful, or even required, when there is no specific media flow related bearer establishment but merely a resource reservation on the user plane. Such a resource reservation is performed in the case of the broadband or xDSL access. In this case the reservation of resources from the bandwidth pool, that is, a "broad band" for the media stream corresponds to the establishment of a bearer for the media stream. Thus, the signaling entity within the second network node is configured to provide information on the at least one media component to said policy decision entity associated with said second gateway. The second policy decision entity is configured to contact said second gateway and to provide said second gateway with authorization information on the at least one media component. The second gateway is configured to enforce the authorization information to establish said at least one second media component bearer between the terminal and said second gateway.

In one embodiment of the invention, said policy decision entity is configured to provide a session identifier to said terminal via said second network node. The terminal is configured to provide said session identifier via said second gateway to said policy decision entity. The policy decision entity is configured to identify said session and said at least one media component based on said session identifier.

In one embodiment of the invention, the terminal is configured to provide the information on the at least one media component to a third network node, which controls said session. The third node has been selected upon the registration of the terminal to an IP multimedia subsystem. The third node participates in the establishing of sessions relating to the terminal. The third network node is configured to provide said information on the at least one media component to said second network node.

In one embodiment of the invention, the terminal is configured to provide said information on the at least one media component to said second network node in a session re-invitation message. The session re-invitation message is, for example, a Session Initiation Protocol (SIP) Invite message repeatedly sent in association with an existing session in order to inform network nodes participating in the session control of session parameters or a change in the session parameters.

In one embodiment of the invention, the third network node is configured to store said information on the at least one media component, to control said session and to provide said information on the at least one media component to said second network node. The terminal is configured to indicate handover to the third network node. In one embodiment of the invention, the first network node and said second network node comprise a proxy call state control function, and said third network node comprises a serving call state control function.

In one embodiment of the invention, the first gateway comprises a Gateway GPRS Support Node. The signaling connection is represented by a signaling bearer. The signaling bearer and the at least one second media component bearer are packet data protocol contexts. The establishment of a media component bearer thus comprises the establishing of a PDP context.

In one embodiment of the invention, the gateway may be a fixed network gateway element and the bearers are, for example, link layer connections, Asynchronous Transfer Mode (ATM) connections or Point-to-Point Protocol (PPP) connections.

In one embodiment of the invention, the second network node comprises said policy decision entity. In one embodiment of the invention, the second network node comprises both the second gateway and the policy decision entity. The second network node may be, for example, a Session Border Controller (SBC). In one embodiment of the invention the policy decision entity is an independent network node, which is separate from the second node. In one embodiment of the invention, the second gateway comprises the policy decision entity.

In one embodiment of the invention, the second network node comprises an Application Function (AF) in accordance with the UMTS end-to-end QoS architecture.

In one embodiment of the invention, the communication system comprises an IP multimedia subsystem.

In one embodiment of the invention, the policy decision entity entitles for the at least one media component bearer, upon the request of the second gateway, quality of service parameters such as, for example, maximum bitrate and a quality of service class, which comprises, for example, a conversational class, a streaming class, an interactive class and a background class. The request of the second gateway to the policy decision function is sent in response to the receiving of a bearer establishment request from the terminal.

In one embodiment of the invention, there is no specific media flow related bearer establishment but merely a resource reservation on the user plane, like in case of the broadband or xDSL access. In this case the reservation of resources from the "broad band" for the media stream corresponds to the establishment of a bearer for the media stream, and the policy decision entity sends the authorization information to the gateway with a push operation, that is, without a preceding request from the gateway.

In one embodiment of the invention, said communication system comprises a mobile communication network. In one embodiment of the invention, said terminal comprises a mobile station or generally a mobile terminal. In one embodiment of the invention, the remote node is a terminal, for example, a SIP user equipment unit or a server, for example, a SIP server such as a Call Processing Server (CPS).

In one embodiment of the invention, said second network node comprises a policy decision point in accordance with the IETF policy framework. The policy decision entity represents the policy decision point. In one embodiment of the invention, the policy decision entity is a policy decision function.

In one embodiment of the invention, the establishing at least one bearer between the terminal and the second gateway further comprises the establishing of at least one connection segment to a connected state, said at least one connection segment belonging to at least two connection segments providing said at least one bearer. To the at least two connection segments belong, for example, a radio connection segment and a radio access connection segment. By a bearer in this context is meant a logical association between two network nodes, for which a certain quality of service is agreed at least preliminarily. The logical association may traverse a number of intermediate network elements such as a Serving GPRS support Node (SGSN) and a Radio Network Controller (RNC). Between neighboring intermediate network elements in the path of the logical association there is a connection segment. A bottleneck connection segment may not always be in an active state and may not have allocated resources associated with it. For example, a radio connection between a mobile station and the radio network is only established when there are packets to be transmitted in either uplink or downlink direction.

In one embodiment of the invention, the communication system comprises at least one of a Global System of Mobile Communications (GSM) network and a Universal Mobile Telephone System (UMTS) network. The mobile station may be, for example, a GSM mobile station or a UMTS mobile station with a dual mode or multimode functionality to support different access types.

In one embodiment of the invention, the computer program is stored on a computer readable medium. The computer readable medium may be a removable memory card, magnetic disk, optical disk or magnetic tape.

The benefits of the invention are related to the enabling of a handover between two IP connectivity access networks. The providing of media component information to a policy decision entity in association with handover results to more reliable functioning of the communication system, since the quality of service information is made available for the control of a new IP connectivity access network. It is not possible for terminals to waste bandwidth by means of unauthorized bandwidth allocations for post-handover bearers. Thus, the invention also reduces bandwidth consumption and enables fair and justified share of resources between terminals.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
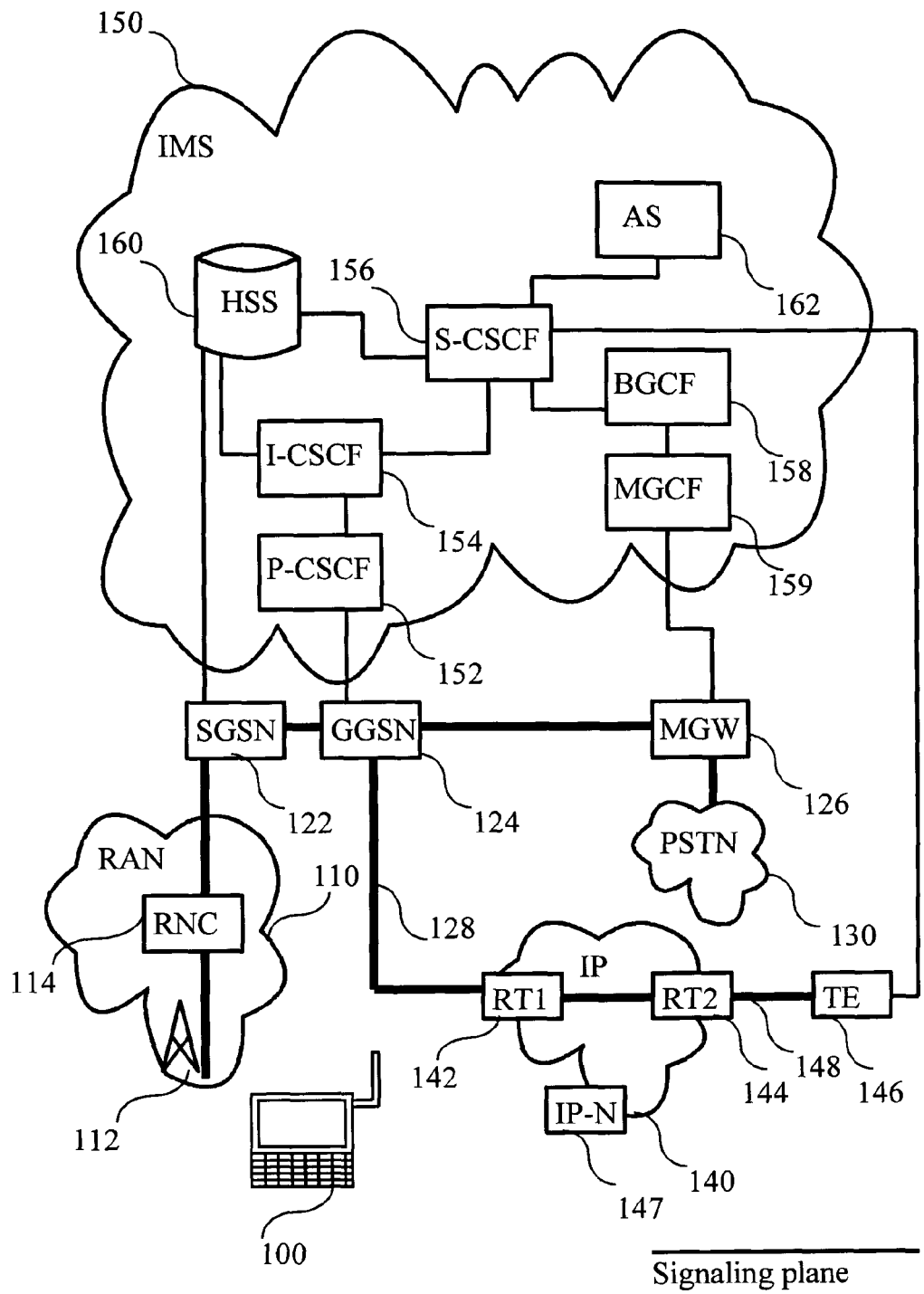
FIG. 1 is a block diagram illustrating a Universal Mobile Telecommunications System (UMTS) in prior art.
Figure 2:
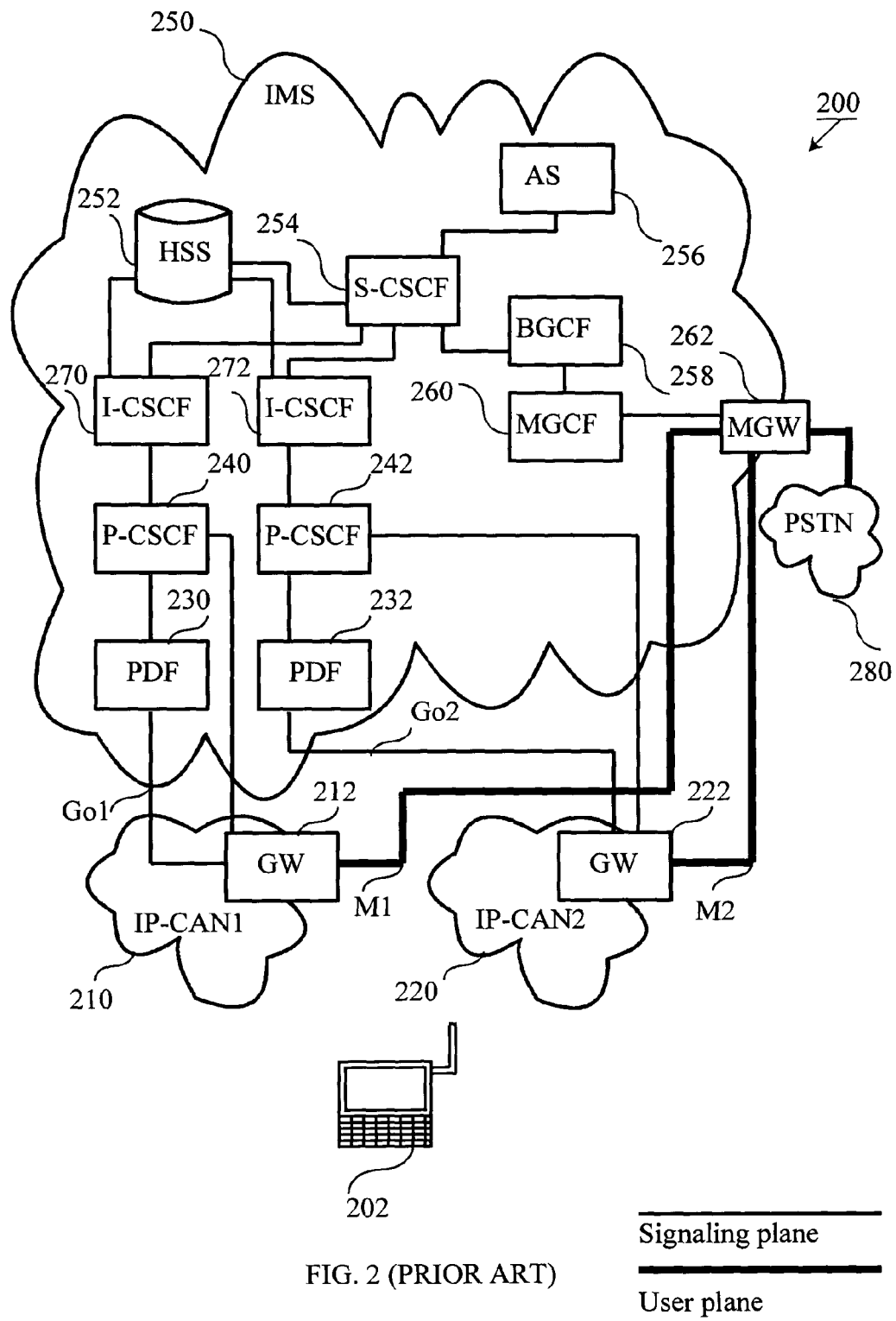
FIG. 2 is a block diagram illustrating a dual-system mobile station and two different IP connectivity access networks connected to a single IP multimedia subsystem in prior art.
Figure 3A:
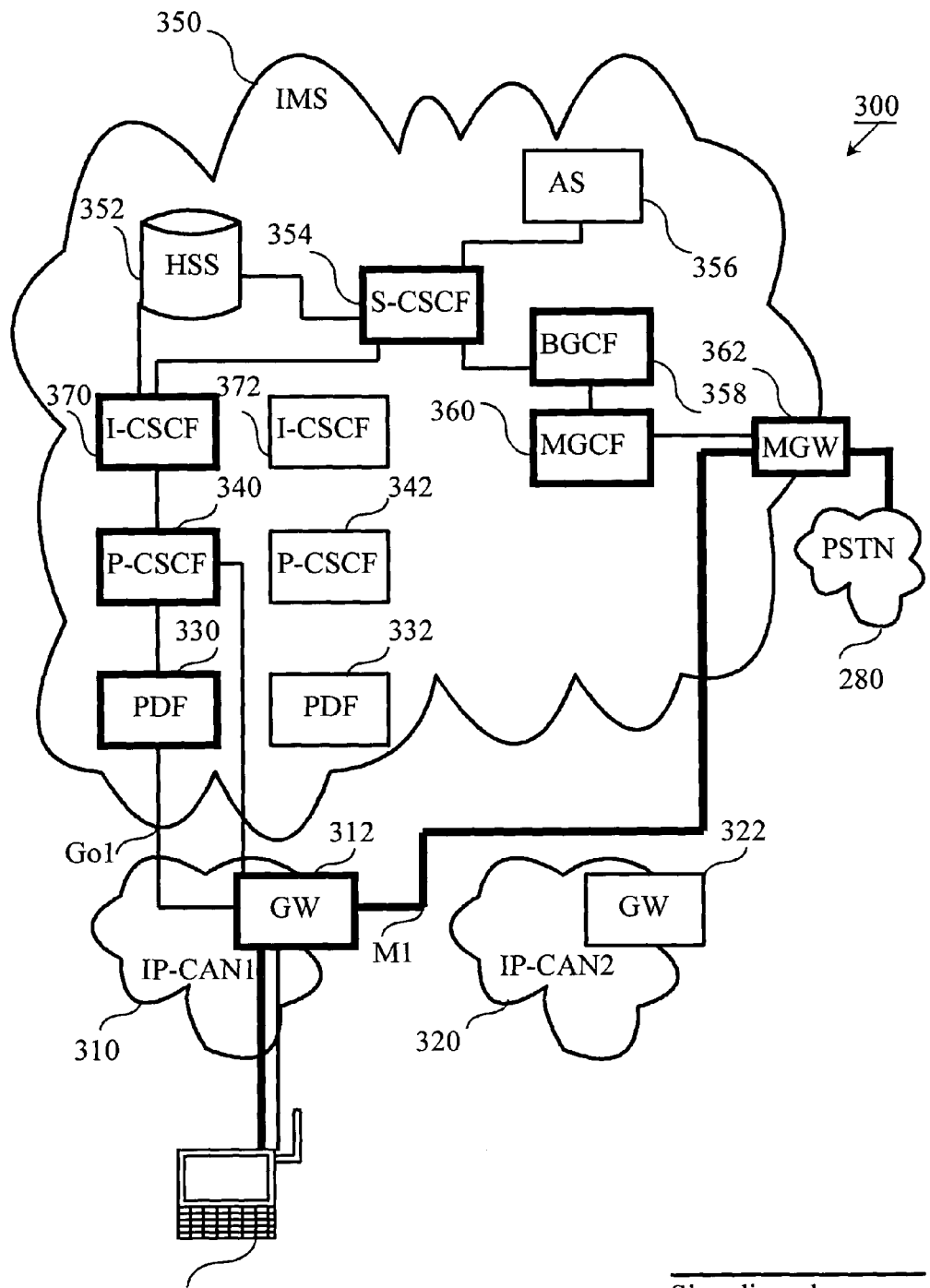
FIG. 3A is a block diagram illustrating the state of a communication system before a handover between two different IP connectivity access networks connected to a single IP multimedia subsystem in one embodiment of the invention.

FIG. 3A is a block diagram illustrating the state of a communication system before a handover between two different IP connectivity access networks connected to a single IP multimedia subsystem in one embodiment of the invention.

In FIG. 3A there is illustrated a communication system 300 which comprises an IP Multimedia Subsystem (IMS) 350, a first IP connectivity access network 310 and a second IP connectivity access network 320. IP multimedia subsystem 350 comprises a Home Subscriber Server (HSS) 352, a Serving CSCF (S-CSCF) 354, a Breakout Gateway Control Function (BGCF) 358 and a Media Gateway Control Function (MGCF) 360, a Media Gateway (MGW) 362, two inquiring CSCFs (I-CSCF), namely I-CSCF 370 and 372. IP multimedia subsystem 350 comprises also two proxy CSCFs (P-CSCF), namely P-CSCF 340 and 342. It also comprises two policy decision functions, namely PDF 330 and PDF 332. It should be noted that in one embodiment of the invention, one or both of the PDFs 330 and 332 may be comprised in P-CSCFs 340 and 342, respectively. Thus, PDF 330 is in P-CSCF 340 and PDF 332 is in P-CSCF 342, in one embodiment of the invention. In one embodiment of the invention one or both of the PDFs 330 and 332 may be comprised in a gateway. In FIG. 3A IP-CAN 310 comprises gateway 312 and IP-CAN 320 comprises gateway 322. There is also a mobile station 302. Mobile station 302 is a dual system mobile station, which is capable to communicate with an IMS 350 using both IP-CAN 310 and IP-CAN 320. By way of illustration, it is assumed that IP-CAN 310 is based on GPRS and UMTS radio access network and IP-CAN 320 is based on a wireless local area network, which is connected to gateway 322, which interfaces at least one WLAN. It should be noted that the IP-CANs can be also of the same type.

Firstly, mobile station 302 communicates with IP multimedia subsystem 350 via IP-CAN 310 and gateway 312. The radio interface (not shown) is based on 3G in other words wideband CDMA (W-CDMA). Mobile station 302 has an ongoing SIP session comprising a number of media components carried by at least one media component bearer between mobile station 302 and gateway 312. The media components are carried over an external bearer M1 between gateway 312 and media gateway 362. The SIP signaling is conveyed via gateway 312, proxy CSCF 340, inquiring SCSF 370, serving SCSF 354, breakout gateway control function 358 and media gateway control function 360 and finally it is converted to circuit switched call signaling in media gateway 362. P-SCSF 340 has authorized the quality of service for the media components by providing media component information to PDF 330. Upon request from gateway 312, PDF 340 has authorized the establishment of at least one PDP context for the media components and it has authorized the quality of service for these PDP contexts. In this case a PDP context acts as media component bearer.

During the ongoing session mobile station 302 determines that an alternative wireless area network based radio access is available. The alternative WLAN based radio access is chosen, for example, based on cost efficiency issues. It is, of course, necessary that the new radio access chosen has sufficient signal quality for mobile station 302 at the moment. Assuming that the signal quality is sufficient, the mobile station 302 initiates the attachment to IP-CAN 320 and gateway 322 therein. The functionalities involved in the session signaling and the relaying of the media components before the handover is properly finished are indicated in FIG. 3A with bold framed boxes.

Figure 3B:
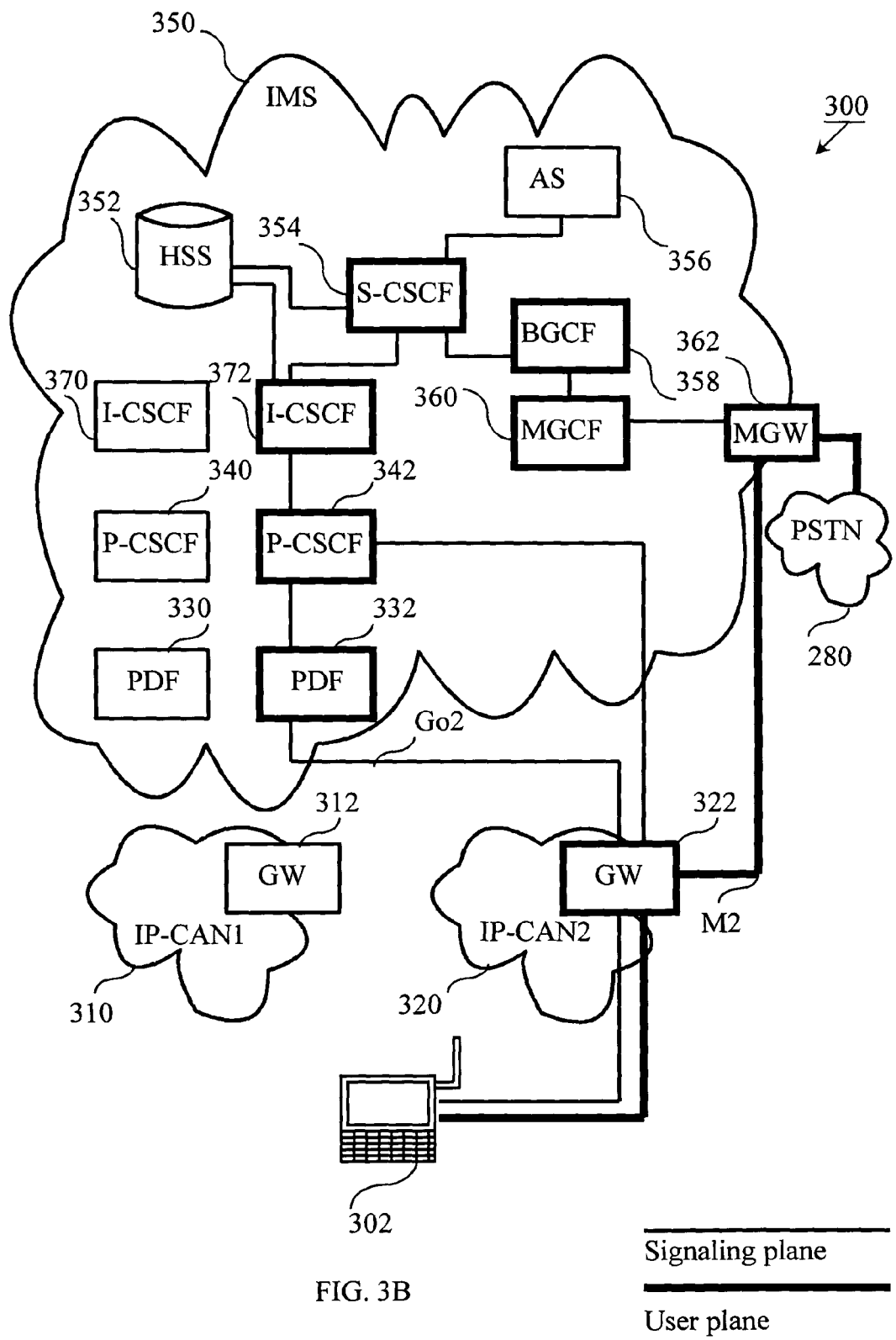
FIG. 3B is a block diagram illustrating the state of a communication system after a handover between two different IP connectivity access networks connected to a single IP multimedia subsystem in one embodiment of the invention.

FIG. 3B is a block diagram illustrating the state of a communication system after a handover between two different IP connectivity access networks connected to a single IP multimedia subsystem in one embodiment of the invention.

FIG. 3B illustrates the functionalities involved after the handover in session signaling and media component relay with bold framed boxes. In order to make the handover of media components possible, mobile station 302 attaches to gateway 322 for the relaying of signaling. Thereupon, mobile station 302 performs the discovery of a proxy CSCF for the conveying of session signaling. As the result of the discovery P-CSCF 342 and thereby policy decision function 342 are selected. Policy decision function 342 communicates with gateway 322. Based on the identity of mobile station 302 P-CSCF 342 determines that the signaling must be forwarded to I-CSCF 372. I-CSCF 372 determines the correct S-CSCF for mobile station 302 by means of information obtained from HSS 352. Thus, signaling information associated with session is obtained to S-CSCF 354. S-CSCF 354 registers information on the current P-CSCF associated with mobile station 302. It is also necessary that mobile station 302 provides in the signaling towards P-CSCF 342 information on the media components associated with the session for which a handover is being performed. Thereby P-CSCF 342 can notify the media components to PDF 332. Thereupon PDF 332 can provide the correct policy decisions to gateway 322 pertaining to the establishment of at least one internal bearer, in other words, a media component bearer between gateway 322 and mobile station 302, and at least one external bearer for carrying the media components associated with the session. As soon as at least one internal bearer and the at least one external bearer have been established to media gateway 362 via gateway 322 it is possible to inform media gateway control function 360 to switch the circuit switched connection towards PSTN 280 to the at least on external bearer established. The external bearer is illustrated with line M2. Mobile station 302 also informs the old IP connectivity access network 310 and gateway 312 of the successful handover and dismantles the bearers via gateway 312. At that point also the old P-CSCF 340 is informed of the handover. The handover completion may also further be communicated to S-CSCF 354.

Figure 4:
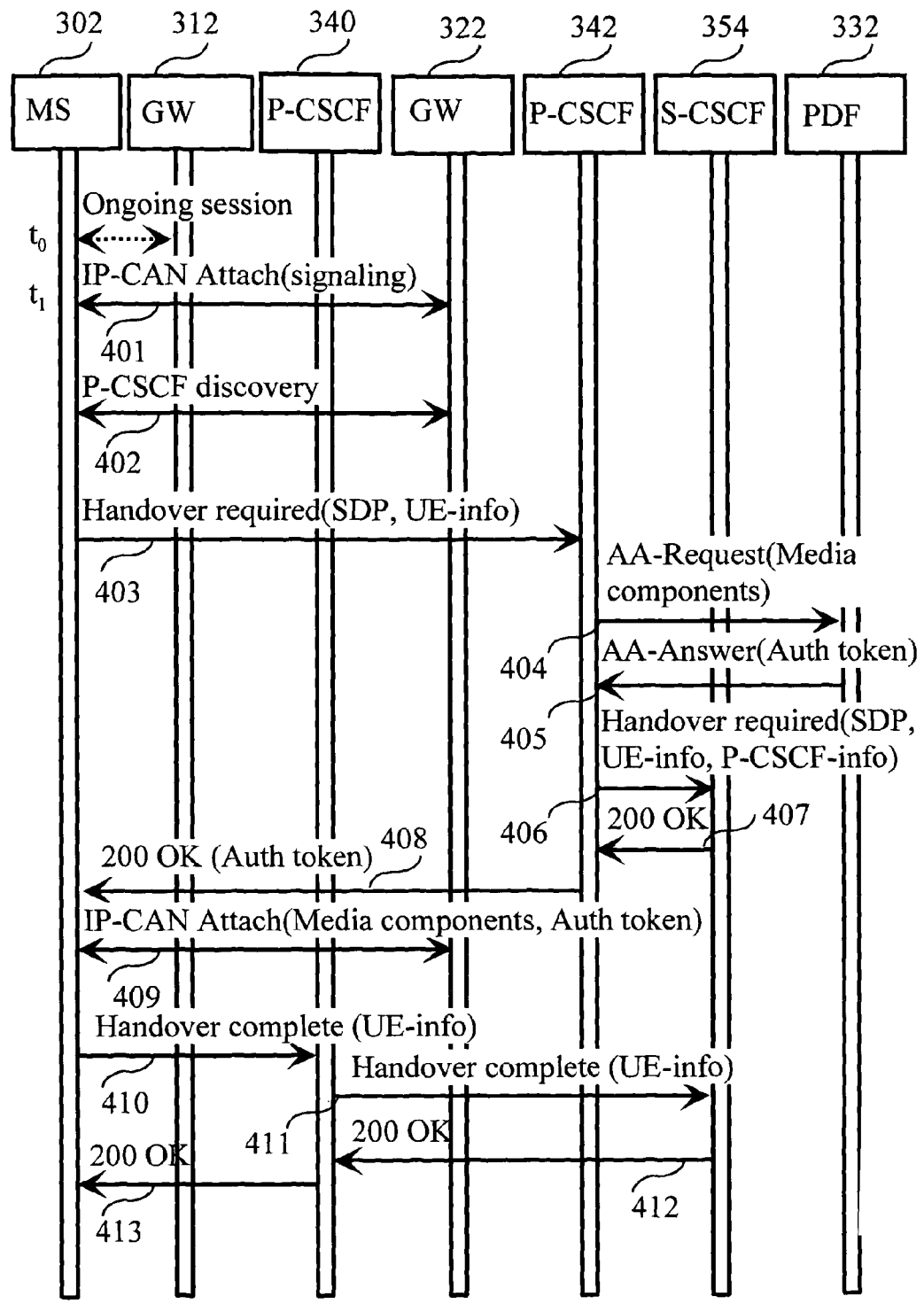
FIG. 4 is a message sequence chart illustrating a handover between two different IP connectivity access networks without re-invitation messaging in one embodiment of the invention.

FIG. 4 is a message sequence chart illustrating a handover between two different IP connectivity access networks without re-invitation messaging in one embodiment of the invention. In FIG. 4 there is a mobile station 302, a gateway 312, a proxy CSCF 340, a gateway 322, a proxy CSCF 342, a serving CSCF 354 and a PDF 332. At time $t_0$ mobile station 302 has an ongoing session via gateway 312. The session signaling has been conveyed via proxy CSCF 340 to serving CSCF 354. For conveying the media components associated with a session between mobile station 302 and gateway 312 there have been established at least one media component bearer from mobile station 302 over the IP-CAN 310 to gateway 312. The media component bearers, that is, the access network bearers have been authorized using QoS information obtained from a PDF associated with P-CSCF 340. The old PDF is not shown.

At time $t_1$ it is assumed that mobile station 302 determines a need to perform handover to a new IP connectivity access network to which gateway 322 is connected. Mobile station 302 attaches to the gateway 322. First, only a bearer or a signaling connection for signaling purposes is established. The IP-CAN attach procedure is illustrated with arrow 401. Thereupon, mobile station 302 performs the discovery of a new proxy CSCF as illustrated with arrow 402. The discovery of new proxy CSCF is performed, for example, by way of DHCP enquiry, which is followed by domain name system enquiry in order to obtain the address of the new P-CSCF. The new proxy CSCF may also be obtained in association with the establishment of the signaling connection or the signaling bearer, for example, in PDP context activation, if the IP-CAN is based on GPRS. Mobile station 302 compares the address of the new proxy CSCF to the address of the old proxy CSCF. In case the address is different it is necessary to initiate an inter-proxy-CSCF handover and to inform the new proxy CSCF of the necessary media component information in order to authorize properly media component bearer establishment via the new gateway 322. Mobile station 302 sends a handover required message to proxy CSCF 342 as illustrated with arrow 403. The handover required message comprises the session description protocol information pertaining to the media components. It also comprises user equipment information, for example, an IP address and user identities, and information on the proxy CSCF. Thereupon, Proxy CSCF 342 sends an AA Request message to PDF 332 as illustrated with arrow 404. The AA request message comprises the information on the media components associated with the ongoing session that must be handed over to the new gateway, that is, gateway 322. The protocol between proxy CSCF 342 and PDF 332 is based on, for example, the Diameter protocol. PDF 332 responds to proxy CSCF 342 with an AA answer message as illustrated with arrow 405. The AA answer message may contain binding information, for example, an authorization token, which specifies the session. Proxy CSCF 342 sends a handover required message to serving CSCF 354 as illustrated with arrow 406. The handover required message comprises the SDP information, user equipment information and information on the new proxy CSCF. The serving CSCF shall store the new proxy CSCF related information and UE context related information comprising, for example, an IP address and user identities when receiving the handover required message. Serving CSCF 354 determines that the media component information provided in the SDP information is authorized for the user also via the new IP connectivity access network. Thereupon, serving CSCF 354 stores the received information and responds with a 200 OK message as illustrated with arrow 407. Proxy CSCF 342 responds to mobile station 302 with a 200 OK message as illustrated with arrow 408. After providing of the media component information to the new PDF associated with gateway 322 it is possible for mobile station 302 to perform IP connectivity network attach to gateway 322, that is, the new gateway. The procedure for IP-CAN attach specifying the media component bearers that are to be established is illustrated with arrow 409. In the IP-CAN attach and bearer establishment procedure the gateway 322 is provided with binding information, for example, an authorization token from PDF 332 and information on the media components or a user identity or a user equipment identity obtained from the terminal and flow identifiers such as IP packet filters. With the binding information and the media component information the gateway 322 may enquire PDF 332 to get a policy decision with parameters for QoS control. After the successful IP connectivity access network attach mobile station 302 issues a handover complete message to the old proxy CSCF 340 as illustrated with arrow 410. The handover complete message comprises at least information on the user equipment, that is, information identifying mobile station 302. Proxy CSCF 340 sends a handover complete message comprising user equipment information to serving CSCF 354 as illustrated with arrow 411. The serving CSCF shall remove the corresponding information related to the old proxy CSCF and UE context when receiving the handover complete message. A 200 OK message is sent by serving CSCF 354 towards mobile station 302 via proxy CSCF 340 as illustrated with arrows 412 and 413. In one embodiment of the invention the handover required message is implemented with a registration message and the handover complete message is implemented with a de-registration message.

Figure 5:
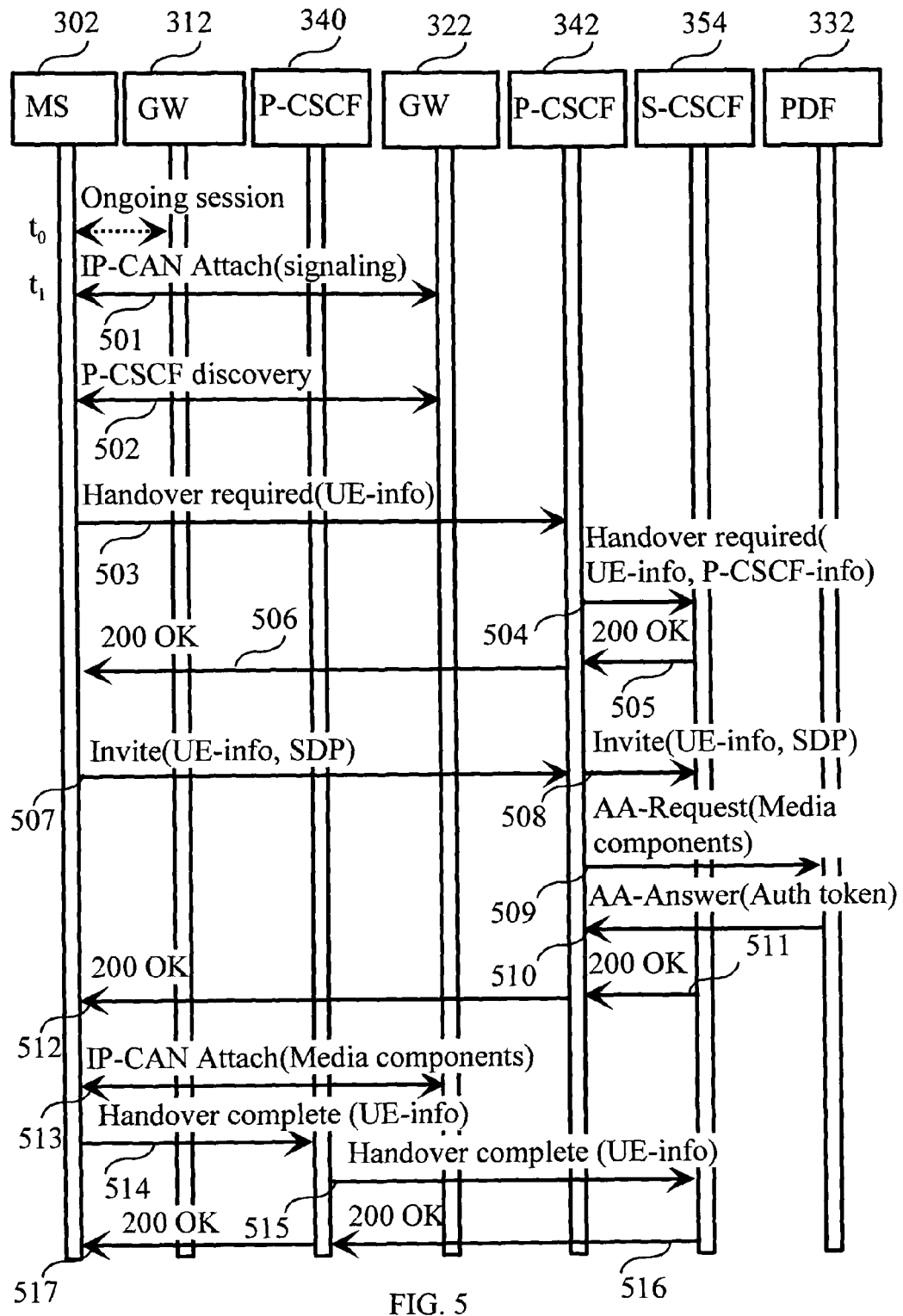
FIG. 5 is a message sequence chart illustrating a handover between two different IP connectivity access networks with re-invitation messaging in one embodiment of the invention.

FIG. 5 is a message sequence chart illustrating a handover between two different IP connectivity access networks with re-invitation messaging in one embodiment of the invention. In FIG. 5 there is a mobile station 302, a gateway 312, a proxy CSCF 340, a gateway 322, a proxy CSCF 342, a serving CSCF 354 and a PDF 332. In FIG. 5 the steps involving the ongoing session, IP-CAN attach procedure and proxy CSCF discovery are substantially similar to the corresponding steps in FIG. 4. Mobile station 302 sends a handover required message to proxy CSCF 342 as illustrated with arrow 503. The handover required message comprises user equipment information, for example, identifying mobile station 302. Proxy CSCF 342 sends the handover required message to serving CSCF 354 as illustrated with arrow 504. The handover required message sent between a proxy CSCF and a serving CSCF also carries information identifying the current proxy CSCF. The serving CSCF shall store the new proxy CSCF related information and UE context related information comprising, for example, an IP address and user identities when receiving the handover required message. Serving CSCF 354 responds to mobile station 302 via proxy CSCF 342 as illustrated with arrows 505 and 506. After receiving the 200 OK message mobile station 302 performs a session initiation protocol re-invite procedure with the serving CSCF 354. Thus, mobile station 302 sends a SIP Invite message to proxy CSCF 342 as illustrated with arrow 507. The invite message comprises at least user equipment information and SDP information. The invite message is sent further by proxy CSCF 342 to serving CSCF 354 as illustrated with arrow 508. Proxy CSCF 342 sends an AA Request message to PDF 332 as illustrated with arrow 509. The AA Request comprises the media component information extracted from the session description protocol information. That information is afterwards utilized by PDF 332 in the authorization of media component bearer establishments that are indicated from the new gateway 322. PDF 332 responds with an AA Answer message as illustrated with arrow 510. The AA Answer message may comprise binding information, for example, comprising an authorization token, which is used to identify the session associated with mobile station 302. In one embodiment of the invention, the binding information is formed only when mobile station 302 performs IP-CAN attach and media component bearer establishment with gateway 322 and provides the user identification or the user equipment identification and flow filters. The binding information is later on provided via the new gateway 322 to PDF 332 in order to authorize the establishment of at least one media component bearer for the media components. Serving CSCF 354 sends a 200 OK message to proxy CSCF 342. Proxy CSCF 342 adds the authorization token to the 200 OK message, if token based authorization is used, and sends it to mobile station 302 as illustrated with arrow 512. Thereupon mobile station 302 may perform the IP-CAN attach procedure with the new gateway 322 as illustrated with arrow 513. In the procedure for IP-CAN attach and bearer establishment, mobile station 302 provides the binding information, for example, the authorization token to gateway 322. Thereupon, handover completion is signaled to proxy CSCF 340 and serving CSCF 354 in a manner similar to FIG. 4. The handover complete indication is thereupon acknowledged by serving CSCF 354 via proxy CSCF 340.

Figure 6:
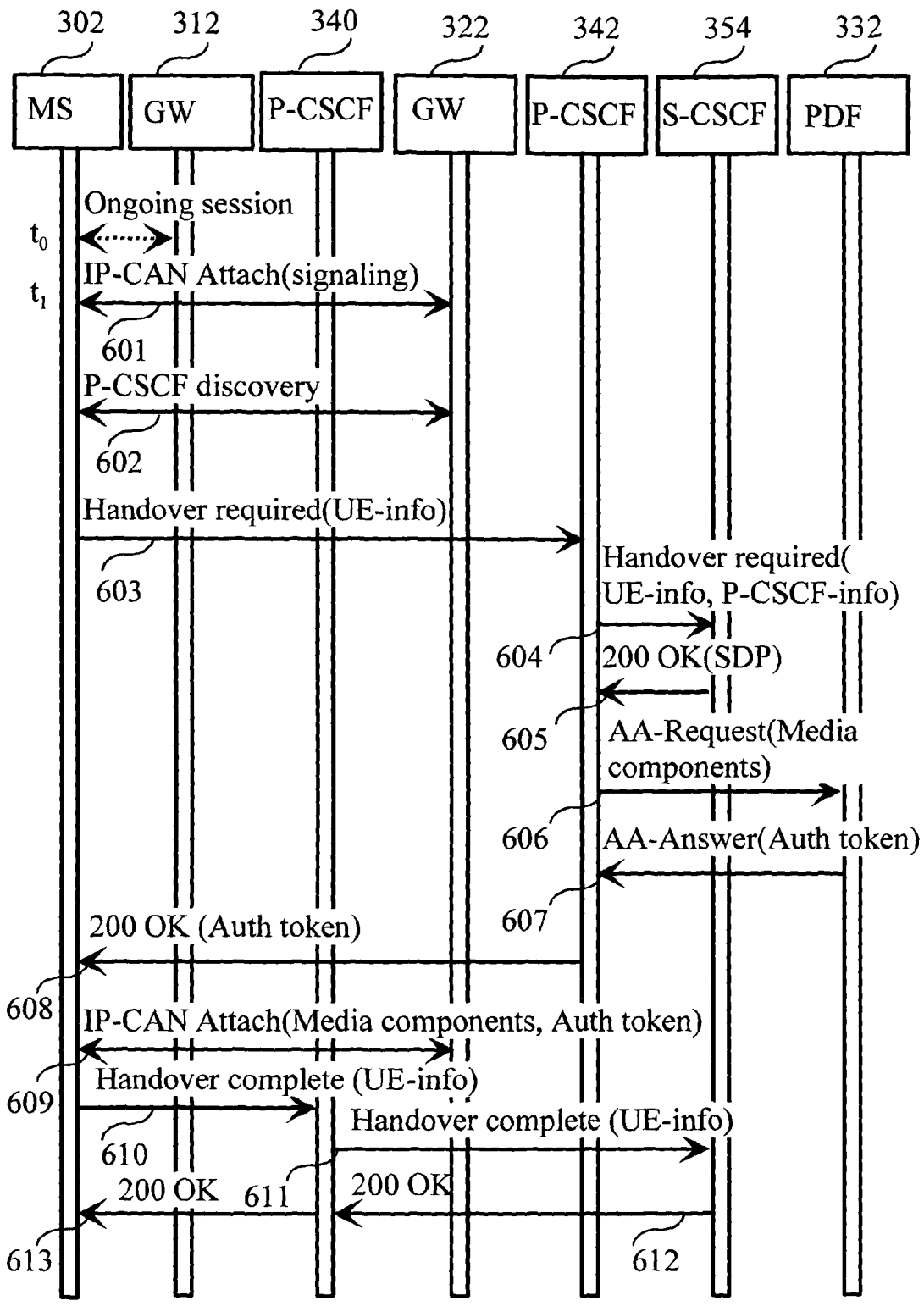
FIG. 6 is a message sequence chart illustrating a handover between two different IP connectivity access networks, which utilizes the retaining of session media component information in a serving node, in one embodiment of the invention.

FIG. 6 is a message sequence chart illustrating a handover between two different IP connectivity access networks, which utilizes the retaining of session media component information in a serving node, in one embodiment of the invention. In FIG. 6 there is a mobile station 302, a gateway 312, a proxy CSCF 340, a gateway 322, a proxy CSCF 342, a serving CSCF 354 and a PDF 332. The steps involving ongoing session signaling and IP connectivity network attach and proxy CSCF discovery are substantially similar to the procedures explained in association with FIG. 4. Mobile station 302 sends a handover required message to proxy CSCF 342 as illustrated with arrow 603. The handover required message carries user equipment information, for example, identifying mobile station 302. Proxy CSCF 342 sends a handover required message to serving CSCF 354 as illustrated with arrow 604. The handover required message comprises user equipment information and proxy CSCF information. The serving CSCF shall store the new proxy CSCF related information and UE context related information comprising, for example, an IP address and user identities when receiving the handover required message. In the embodiment illustrated in FIG. 6 serving CSCF 354 retains information on the session description protocol description relating to the media components. Therefore, it is possible for serving CSCF 354 to provide session description protocol information regarding the media components to proxy CSCF 342 as illustrated with arrow 605. Proxy CSCF 342 sends an AA Request message to PDF 332 as illustrated with arrow 606. The message comprises information on the media components relating to the ongoing session. PDF 332 responds to proxy CSCF 342 with an AA Answer message comprising an authorization token, if token is used for binding, as illustrated with arrow 607. Proxy CSCF 342 forwards a 200 OK message to mobile station 302 as illustrated with arrow 608. The 200 OK comprises the authorization token, if token is used for binding. Thereupon, mobile station 302 performs an IP-CAN attach procedure with gateway 322. In the IP-CAN attach and bearer establishment procedure mobile station 302 provides the binding information to gateway 322, that is, the new gateway. Thereupon, handover completion is signaled to the proxy CSCF 340, namely the old proxy CSCF, and to serving CSCF 354 in a manner similar to FIGS. 4 and 5.

Figure 7:
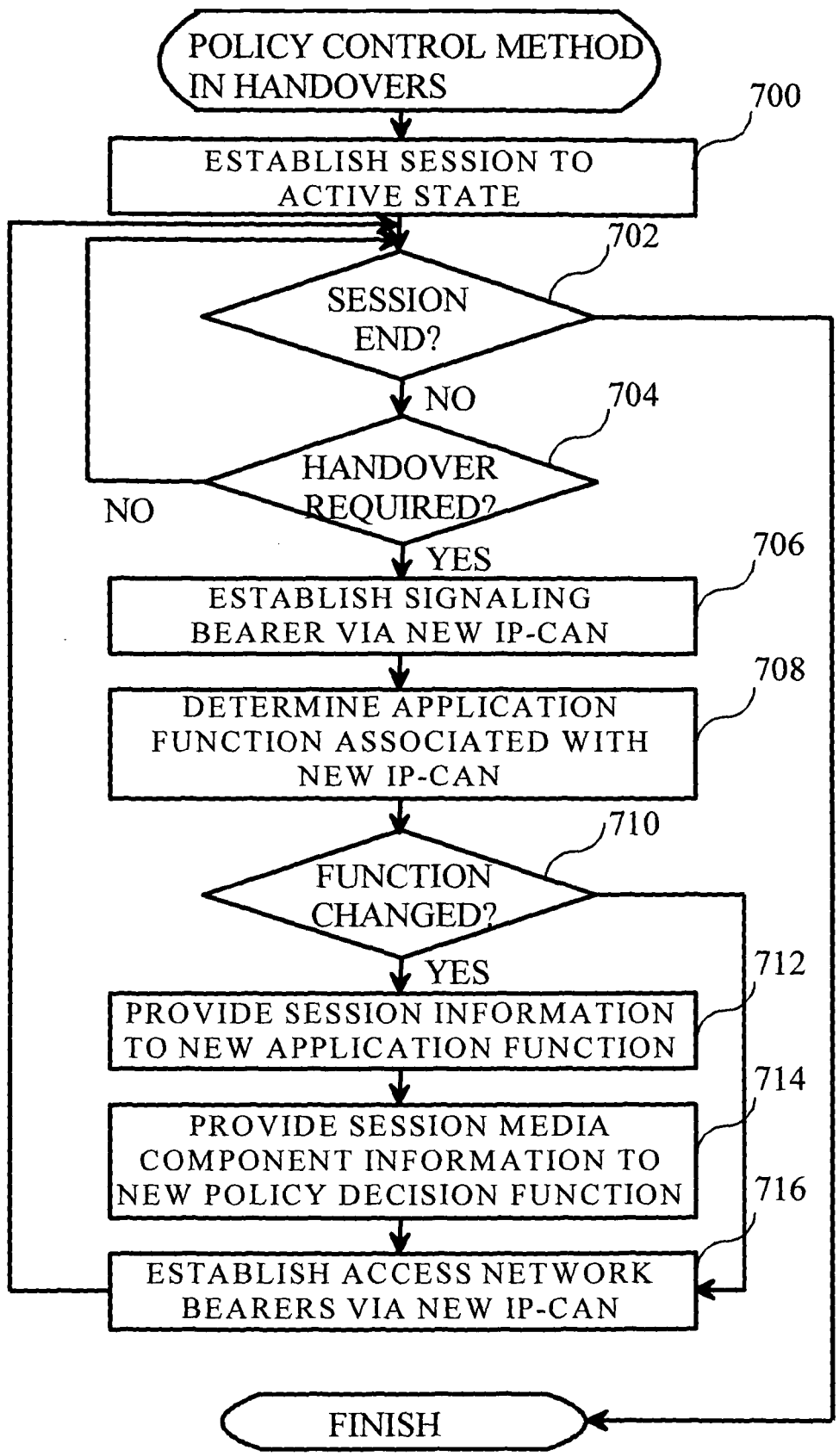
FIG. 7 is a flow chart illustrating a method for the transfer of policy control information during handover in a communication system in one embodiment of the invention.

FIG. 7 is a flow chart illustrating a method for the transfer of policy control information during handover in a communication system in one embodiment of the invention.

At step 700 a user equipment, for example, a mobile station or a terminal establishes a session to active state. By active state is herein meant a session state which enables bidirectional or unidirectional communication with a remote party using at least one media component.

At step 702 it is checked if the session is to be released. If the session is not released, the method continues at step 704.

At step 704 it is checked if handover is required to a new IP connectivity access network. If the handover is not required the method continues at step 702. Otherwise the method continues at step 706.

At step 706 the user equipment establishes a signaling connection, which may be a signaling bearer, via a new IP connectivity access network.

At step 708 the application function associated with the new IP connectivity access network is determined. An example of such an application function is a proxy CSCF.

At step 710 it is determined by the user equipment, if the application function has changed. If the application function has not changed, the method continues at step 716. If the function has changed the method continues at step 712.

At step 712 session information is provided to new application function. The session information comprises information on the media components associated with the session.

At step 714 media component information associated with the session is provided to a new policy decision function, that is, a policy decision entity or a policy decision point, which is communicating with the new application function. In one embodiment of the invention the application function checks whether the policy decision function has actually changed during the handover.

At step 716 media component bearers are established via the new IP connectivity access network. In one embodiment of the invention the establishment involves the conveying of an authorization token generated by the new policy decision function via the user equipment and the new IP connectivity access network back to the new policy decision function. The authorization token is used to determine the authorization for the quality of service requested for the new access bearers.

Figure 8:
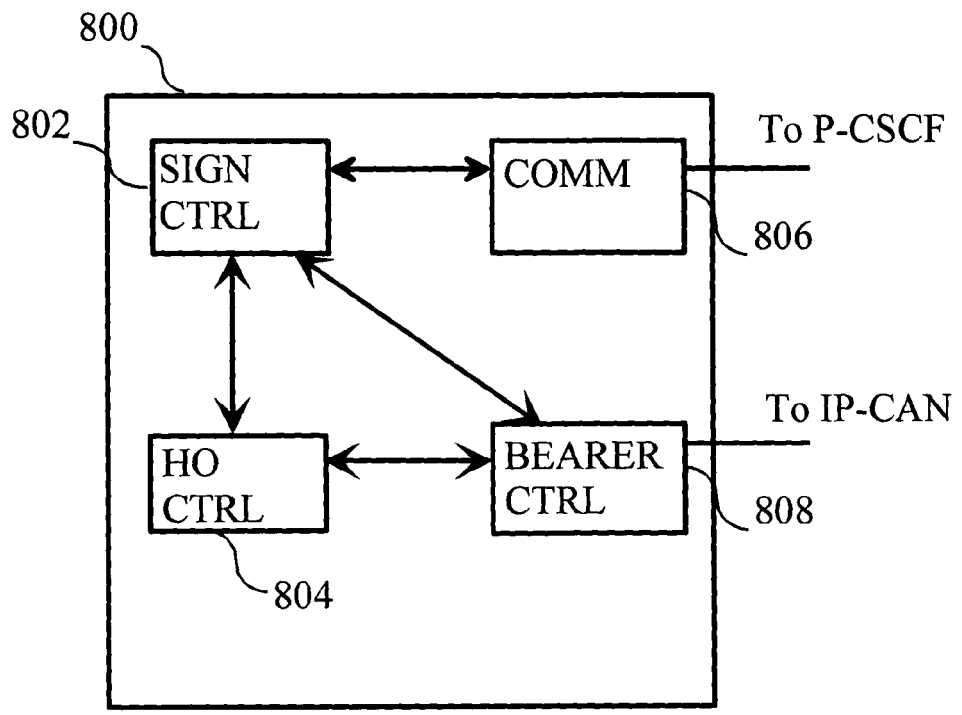
FIG. 8 is a block diagram illustrating a terminal in one embodiment of the invention.

FIG. 8 is a block diagram illustrating a terminal in one embodiment of the invention.

In FIG. 8 there is illustrated a mobile station 800. Mobile station 800 comprises a signaling control entity 802, a communication entity 806, a handover control entity 804 and a bearer control entity 808. Signaling control entity 802 takes care of all mobility and session establishment related signaling. The signaling messages are conveyed via an internal interface to communication entity 806 which comprises for example IP protocol stack. Communication entity 806 communicates with at least a proxy call state control function. Bearer control entity 808 takes care of all access network bearer establishment and release related tasks. It communicates with signaling control entity 802. Bearer control entity 808 communicates to IP connectivity access network in the establishment of bearers. It also communicates with a handover control entity 804. The handover control entity 804 takes care of the handover decisions based on measurement data provided via bearer control entity 808. Signaling control entity 802 also decides when it is necessary to perform the signaling procedures relating to the informing of a new proxy call state control function on the media components relating to a session it decides when the proxy call state control function has changed.

Figure 9:
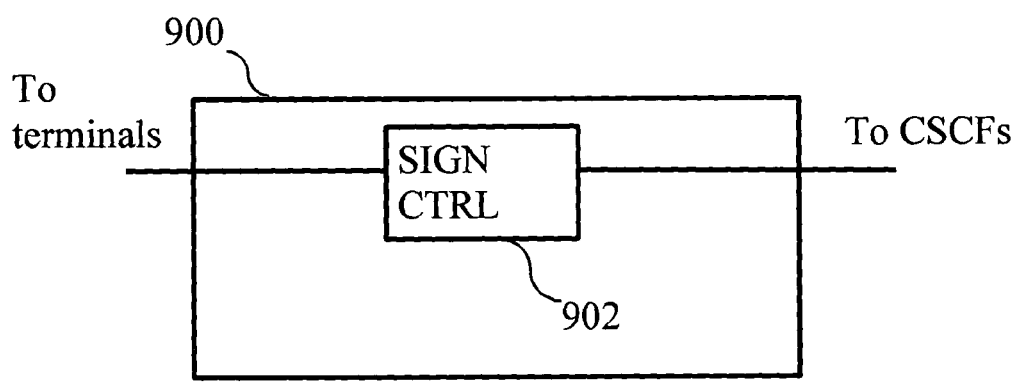
FIG. 9 is a block diagram illustrating a network node in one embodiment of the invention.

FIG. 9 is a block diagram illustrating a network node in one embodiment of the invention. In FIG. 9 there is a network node, for example, a proxy CSCF. The network node comprises a signaling entity 902, which performs all the signaling related tasks with other network nodes such as, for example, I-CSCFs, S-CSCFs and PDFs, and with mobile stations.

The entities within the electronic device 800 in FIG. 8, which is usually a mobile terminal, such as signaling control entity 802, a communication entity 806, a handover control entity 804 and a bearer control entity 808 may be implemented in a variety of ways. The same is true concerning signaling entity 902 within network node 900 and all other possible entities in FIG. 9. They may be implemented as processes executed under the native operating system. The entities may be implemented as separate processes or threads or so that a number of different entities are implemented by means of one process or thread. A process or a thread may be the instance of a program block comprising a number of routines, that is, for example, procedures and functions. The entities may be implemented as separate computer programs or as a single computer program comprising several routines or functions implementing the entities. The program blocks are stored on at least one computer readable medium such as, for example, a memory circuit, memory card, magnetic or optic disk. Some entities may be implemented as program modules linked to another entity.

In the case of network node 900 the computer readable medium may also be connected to another computer unit, which acts as a proxy for network node 900 when reading or writing data to the computer readable medium.

The entities in FIGS. 8 and 9 may also be stored in separate memories and executed by separate processors, which communicate, for example, via a message bus or an internal network. An example of such a message bus is the Peripheral Component Interconnect (PCI) bus.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
   causing a session between a terminal and a remote node to be established via a first network node, said session comprising at least one media component;
   causing said at least one media component to be transmitted via a first gateway using at least one first media component bearer;
   detecting a handover condition;
   obtaining, responsive to detection of the handover condition, information of a second network node to determine whether said first network node and a second network node are different nodes, wherein the first network node and the second network node are a same type of node;
   causing information of the at least one media component to be provided to said second network node;
   causing establishment of a signaling connection between the terminal and a second gateway to be requested; and
   causing establishment of at least one second media component bearer between said terminal and said second gateway to be requested.

2. The method according to claim 1, the method further comprising:
   causing said information of the at least one media component to be provided from said second network node to said policy decision entity associated with said second gateway;
   initiating the establishing of said at least one second media component bearer between said terminal and said second gateway;
   contacting a policy decision entity using said second gateway;
   checking said information of the at least one media component using said policy decision entity; and
   authorizing to said second gateway said establishing of said at least one second media component bearer between said terminal and said second gateway using said policy decision entity.

3. The method according to claim 2, the method further comprising:
   obtaining binding information related to said session and said at least one media component;
   causing said binding information related to said session and said at least one media component to be provided from said terminal via said second gateway to said policy decision entity; and
   identifying said session and said at least one media component in said policy decision entity based on said binding information.

4. The method according to claim 1, the method further comprising:
   causing said information of the at least one media component to be provided from said second network node to a policy decision entity associated with said second gateway;
   said policy decision entity contacting said second gateway and providing said second gateway with authorization information on the at least one media component; and
   said second gateway enforcing the authorization information to establish said at least one second media component bearer between said terminal and said second gateway.

5. The method according to claim 1, the method further comprising:
   causing said information of the at least one media component to be provided from said terminal to said second network node in a session re-invitation message.

6. The method according to claim 1, the method further comprising:
   causing said information of the at least one media component to be provided from said terminal to a third network node, which controls said session;
   causing said information of the at least one media component to be stored in said third network node;
   causing a handover from said terminal to said third network node to be indicated; and
   causing said information of the at least one media component to be provided from said third network node to said second network node.

7. The method according to claim 1, wherein said first network node and said second network node comprise a proxy call state control function.

8. The method according to claim 1, wherein said first gateway comprises a Gateway GPRS (General Packet Radio Service) Support Node.

9. The method according to claim 8, wherein said at least one second media component bearer is a packet data protocol context.

10. The method according to claim 1, wherein said second network node comprises a policy decision entity.

11. A system comprising:
   a first network node;
   a second network node, the first network node and the second network node being a same type of node;
   a first gateway;
   a second gateway;
   a remote node and
   a terminal configured to:
      cause a session between the terminal and said remote node to be established via said first network node, said session comprising at least one media component;
      cause said at least one media component to be transmitted via said first gateway using at least one first media component bearer;
      detect a handover condition;
      obtain, responsive to detection of the handover condition, information of said second network node to determine whether said first network node and said second network node are different nodes;

cause information of the at least one media component to be provided to said second network node;

cause establishment of a signaling connection between said terminal and said second gateway to be requested; and cause establishment of at least one second media component bearer between said terminal and said second gateway to be requested.

12. The system according to claim 11, wherein
said second network node is configured to provide said information of the at least one media component from said second network node to a policy decision entity associated with said second gateway,
said terminal is configured to initiate the establishment of said at least one second media component bearer between said terminal and said second gateway,
said second gateway is configured to contact said policy decision entity, and
said policy decision entity is configured to check said information on said at least one media component, and to authorize to said second gateway said establishment of said at least one second media component bearer between said terminal and said second gateway.

13. The system according to claim 12, wherein
said policy decision entity is configured to obtain binding information related to said session and said at least one media component,
said terminal is configured to provide said binding information related to said session and said at least one media component via said second gateway to said policy decision entity, and
said policy decision entity is configured to identify said session and said at least one media component based on said binding information.

14. The system according to claim 11, wherein
said second network node is configured to provide said information of the at least one media component to a policy decision entity associated with said second gateway,
said second policy decision entity is configured to contact said second gateway and to provide said second gateway with authorization information on the at least one media component, and
said second gateway is configured to enforce the authorization information to establish said at least one second media component bearer between said terminal and said second gateway.

15. The system according to claim 11, wherein
said terminal is configured to provide said information of the at least one media component to said second network node in a session re-invitation message.

16. The system according to claim 11, wherein said terminal is configured to provide said information of the at least one media component to a third network node, said third network node is configured to store said information of the at least one media component, to control said session, and to provide said information of the at least one media component to said second network node, and said terminal is configured to indicate said handover to said third network node.

17. The system according to claim 11, wherein said first network node and said second network node comprise a proxy call state control function.

18. The system according to claim 11, wherein said first gateway comprises a gateway General Packet Radio Service (GPRS) support node.

19. The system according to claim 18, wherein said at least one second media component bearer is a packet data protocol context.

20. The system according to claim 11, wherein said second network node comprises a policy decision entity.

21. The system according to claim 11, wherein said second network node comprises said second gateway and a policy decision entity.

22. The system according to claim 11, wherein said communication system comprises an interne protocol multimedia subsystem.

23. An apparatus comprising at least one processor and at least one memory including computer program code, the at least one memory and the computer program code configured to, with the at least one processor, direct the apparatus at least to:

cause a session to a remote node to be established via a first network node, said session comprising at least one media component;

cause said at least one media component to be transmitted via a first gateway using at least one first media component bearer;

detect a handover condition;

obtain, responsive to detection of the handover condition, information of a second network node to determine whether said first network node and said second network node are different nodes, wherein the first network node and the second network node are of a same type;

cause information of the at least one media component to be provided to said second network node;

cause establishment of a signaling connection between a terminal and a second gateway to be requested; and cause establishment of at least one second media component bearer between said terminal and said second gateway to be requested.

24. A computer program product comprising a memory having a computer program stored thereon, the computer program configured to direct an apparatus to:

cause a session between a terminal and a remote node to be established via a first network node, said session comprising at least one media component transmitted via a first gateway using at least one first media component bearer;

cause said at least one media component to be transmitted via a first gateway using at least one first media component bearer;

detect a handover condition;

obtain, responsive to detection of the handover condition, information of a second network node to determine whether said first network node and said second network node are different nodes, wherein the first network node and the second network node are a same type of node;

cause information of the at least one media component to be provided to said second network node;

cause establishment of a signaling connection between the terminal and a second gateway to be requested; and cause establishment of at least one second media component bearer to said second gateway to be requested.

25. The computer program product according to claim 24, wherein said memory is a removable memory card.

26. The computer program product according to claim 24, wherein said memory is a magnetic or an optical disk.

27. An apparatus comprising:
means for causing a session between a terminal and a remote node to be established via a first network node, said session comprising at least one media component;

means for causing said at least one media component to be transmitted via a first gateway using at least one first media component bearer;

means for detecting a handover condition;

means for obtaining, responsive to detection of the handover condition, information of a second network node to determine whether said first network node and said second network node are different nodes;

means for causing information of the at least one media component to be provided to said second network node;

means for causing the establishment of a signaling connection between said terminal and a second gateway to be requested; and means for causing establishment of at least one second media component bearer between said terminal and said second gateway to be requested.

28. The apparatus according to claim 23, wherein the apparatus is further directed to cause said information of the at least one media component to be provided from said terminal to said second network node in a session re-invitation message.

29. The apparatus according to claim 23, wherein the apparatus is further directed to cause binding information related to the at least one media component to be provided from said terminal via said second gateway to said policy decision entity.

30. The method of claim 1, further comprising:
causing said information of the at least one media component to be provided to a third network node which is configured to control said session; and
causing said handover to be indicated to said third network node.

31. The system of claim 11, wherein the terminal is further configured to:
cause said information of the at least one media component to be provided to a third network node which is configured to control said session; and
cause said handover to be indicated to said third network node.

32. The apparatus of claim 23, wherein the apparatus is further directed to:
cause said information of the at least one media component to be provided to a third network node which is configured to control said session; and
cause said handover to be indicated to said third network node.

33. The computer program product of claim 24, wherein the computer program is further configured to direct the apparatus to:
cause said information of the at least one media component to be provided to a third network node which is configured to control said session; and
cause said handover to be indicated to said third network node.

34. The apparatus of claim 27 further comprising:
means for causing said information of the at least one media component to be provided to a third network node which is configured to control said session; and
means for causing said handover to be indicated to said third network node.

* * * * *

UNITED STATES PATENT AND TRADEMARK OFFICE
CERTIFICATE OF CORRECTION

PATENT NO.        : 8,577,368 B2  
APPLICATION NO.   : 11/482084  
DATED             : November 5, 2013  
INVENTOR(S)       : Räsänen Page 1 of 1

It is certified that error appears in the above-identified patent and that said Letters Patent is hereby corrected as shown below:

In the claims:

Column 20,
Line 11, "interne protocol multimedia" should read --internet protocol multimedia--.

Signed and Sealed this
Eighteenth Day of March, 2014

Michelle K. Lee
*Deputy Director of the United States Patent and Trademark Office*